Jan. 27, 1953 J. A. SCARLETT 2,626,758
MULLING MACHINE

Filed Nov. 30, 1950 3 Sheets-Sheet 1

INVENTOR.
John A. Scarlett
Wood, Arey, Henon & Evans
ATTORNEYS

INVENTOR.
John A. Scarlett
BY
Wood, Arey, Henon & Evans
ATTORNEYS

Jan. 27, 1953    J. A. SCARLETT    2,626,758
MULLING MACHINE
Filed Nov. 30, 1950    3 Sheets-Sheet 3

INVENTOR.
John A. Scarlett
BY
Wood, Ary, Henn & Evans
ATTORNEYS

Patented Jan. 27, 1953

2,626,758

UNITED STATES PATENT OFFICE 2,626,758

MULLING MACHINE

John A. Scarlett, Cincinnati, Ohio

Application November 30, 1950, Serial No. 198,355

3 Claims. (Cl. 241—124)

This invention relates to mulling machines, and is directed in particular to a muller suitable for laboratory or experimental work.

The machine of this invention has been designed primarily for mixing small test batches of sand and bonding agents of the types utilized in foundry molding operations. In preparing such mixtures, the object is to knead the materials until each grain of sand is coated evenly with a thin film of bonding agent. The method utilized in production machines is to repeatedly roll the mixture under rather heavy, wide tread wheels; and, in order that the test batches prepared in the present machine are truly representative of the mixes which would result from production runs comprising the same ingredients, the present machine incorporates counterparts of the mulling elements actually used in the large mullers.

In the present machine, however, the mechanism, and particularly the moving parts of the mixing apparatus, is greatly simplified in comparison with production machines. For example, the muller wheels are incorporated in a unitary assembly. In the large machines, the muller wheels usually are independently mounted, through complex linkages, at opposite sides of a spider bracket or similar element. The linkage is to permit the wheels to move up and down, or float, relative to the bracket in order to accommodate unevenness in the material being operated upon. The inventor provides such floating action in the muller wheels of the present machine; however, it is by means of a simple, slidable driving connection for the wheel assembly. The action of the more complex muller wheel assemblies is thus attained, by permitting the present assemblies to move up and down as a unit, instead of each wheel independently.

In addition, the present machine incorporates scraper blades or plows which operate in the same way that their counter-parts do in production mullers. These elements serve to turn over and plow the material back into the paths of the muller wheels after each pass. In the present instance, however, the blades are mounted upon a carriage which is a unit separate from the wheel assembly. The scraper blade carriage is connected directly to the main drive shaft of the machine independently of the wheel assembly so that the scraping action of the blades is not affected by either the motion or position of the muller wheels. That is, scraping contact is maintained constantly between the blades and work table in spite of the floating action of the wheels.

The simplicity of construction discussed above is one object of the invention. Another object is to provide a muller constructed in such a way that it can be disassembled quickly and easily in order that all parts exposed to the mix can be thoroughly cleaned between runs. In the present instance, disassembly is simply a matter of lifting the parts free of the machine; and no tools are required either to remove or replace them. This feature is important in machines of this type inasmuch as experimental runs usually differ one from the other; and, since it is found that slight changes in the ingredients in core sand necessarily result in a wide variation in the physical characteristics of the end products, if a fine difference is desired between two separate batches, it is almost necessary that there be no residue remaining in the machine from one batch to another.

In addition to the disassembly feature, the parts themselves are constructed so that they are not subject to being harmed by harsh cleaning methods. The main drive shaft bearings, and, in fact, all parts which would be harmed by such cleaning, are either entirely enclosed and sealed or are in such a position as to be unharmed by cleaning.

In the preferred construction, the machine weighs approximately 85 pounds, is less than 14 inches high and approximately the same width. Thus, it can be rather easily handled and readily moved about from place to place. And, for convenience, the small electric motor needed, $\frac{1}{12}$ H. P. has been found to be adequate, can be plugged into any standard voltage outlet.

Although the machine is designed primarily for mixing core sands, other uses are anticipated. For example, semi-paste pigments can be mixed successfully in it, inasmuch as the construction is such that the parts are not fouled by such mixtures. Dry materials also can be mixed in the machine. In fact, it has utility in any operation where it is desired to disperse one finely divided or paste-like medium throughout another.

Other objects and features of the invention will be readily apparent from the following detailed description of the drawing in which.

The first three figures of the drawings show the various parts of the machine. The muller wheel assembly is indicated at 10, the scraper blade assembly at 11, the cylindrical shell at 12 and the body of the machine at 13. These parts will be described in detail in the order set forth.

Figure 5:
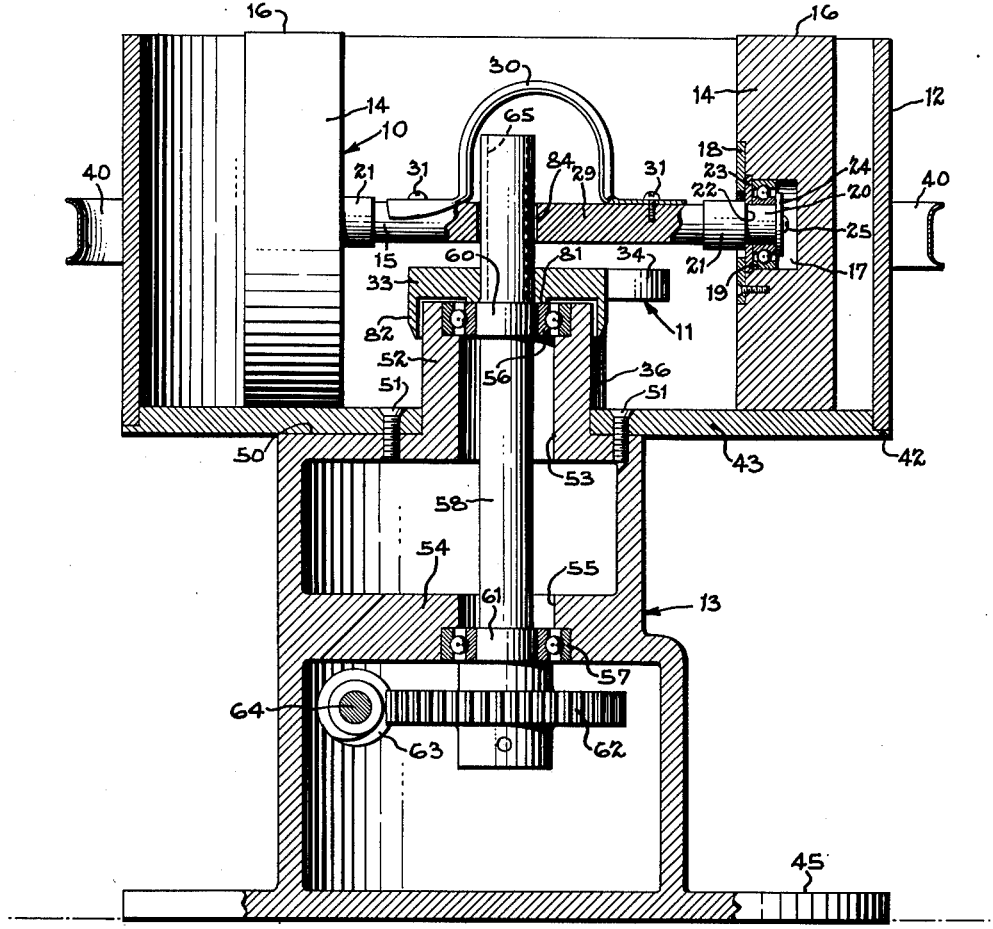
Figure 5 is a cross sectional view through the machine showing the details of the mounting for the drive shaft.

The details of the muller wheel assembly are illustrated best in Figure 5. Generally, the assembly includes a pair of heavy metal wheels 14—14 and a cross shaft 15. Preferably, each of the wheels is machined from a single piece of metal stock, providing a wide, flat tread 16, which may be hardened to increase its resistance to wear. At the inner face of each wheel, a central recess 17 is provided, and concentric with the recess the inner face is machined out to provide a seat for a bearing retainer plate 18. The recess 17 is adapted to receive a ball bearing 19 in press fit relationship. The bearing is carried on a journal 20 at the outer end of the cross shaft and preferably is secured thereon by a press fit. Just inwardly of the journal 20, a hub 21 is machined from the cross shaft stock to provide a retaining shoulder 22. The shoulder is engageable with a sealing ring 23 which rests against the inner face of the ball bearing 19, between it and the retainer plate 18. At the outer end of cross shaft 15, a lock washer 24 is fixed by means of a bolt 25 which threads axially into the shaft. The lock washer 24 engages the inner race of the ball bearing 19 and the retainer plate 18 presses against the outer race. The shoulder 22 thus prevents movement of the wheel radially inwardly and lock washer 24 prevents movement of the wheel outwardly. This particular construction is preferred inasmuch as it provides a sealed journal assembly which is not subject to harm by cleaning.

Off center with respect to the two wheels, the cross shaft 15 has a journal bore 27 provided therein. It will be noted that the bore 27 has one side flattened as at 28. Around bore 27 the cross shaft is enlarged to provide a hub portion 29. In the preferred embodiment, a strap handle 30 is provided for the muller wheel assembly by which it can be lifted. The handle is U-shaped and is secured to the cross shaft by a pair of bolts 31—31 which extend through holes at the respective ends of the handle strap 30 and thread into appropriate bores in the cross shaft. It will be noted that the strap is centered with respect to the wheels and not with respect to the bore 27 so that the weight of the assembly is substantially evenly distributed on both sides of it.

The scraper blade assembly 11 has a bore 32 through it which is identical with the bore 27 in the muller wheel assembly 10. Surrounding the bore 32 a hub portion 33 is provided and from this hub portion a pair of arms 34 and 35 extend outwardly. The arm 34 is substantially longer than arm 35 and its outer end is turned over at right angles. The inner face of the angular portion of arm 34 is milled off to provide a flat seat for a scraper blade 36. Blade 36 depends from the seat and when the scraper assembly is in place within the machine, is so situated that it scrapes both the inner surface of the shell and the table of the machine. The other arm 35 carries a scraper blade 37 which extends generally tangentially from the hub 33, depending downwardly from the hub so that the lower edge of it scrapes the table. In operation, the scraper blade 36 is designed to plow the mix inwardly, and scraper blade 37 is designed to plow it outwardly. This action will be discussed further below.

Shell 12 is simply a metal cylinder which is provided with a pair of handles 40—40 at opposite sides. These handles are secured to the shell wall by pairs of bolts 41—41. Referring to Figure 5, it will be noted that the lower rim of the shell 12 is designed to engage within a rabbeted-out seat 42 which extends around the outer edge of the work table 43 of the machine. This construction permits the shell to be lifted free of the machine so that all parts of the table are exposed for cleaning purposes and so that the shell itself may be cleaned easily.

Figure 1:
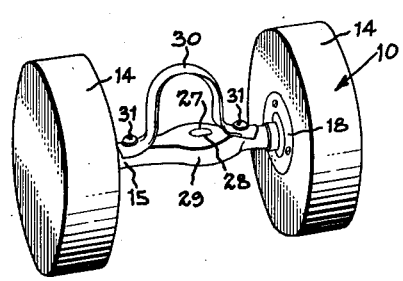
Figure 1 is a perspective view of the muller wheel assembly.
Figure 3:
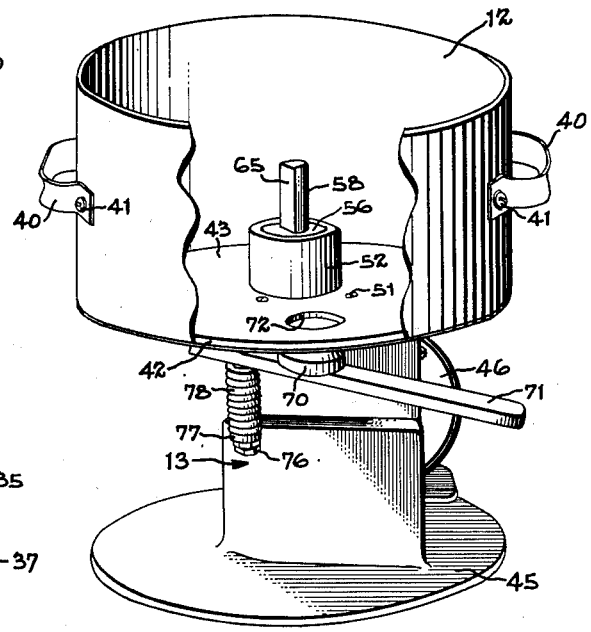
Figure 3 is a perspective view of the machine with the muller wheel and scraper blade assemblies removed and the shell partially broken away in order to show the drive shaft and turret construction.
Figure 2:
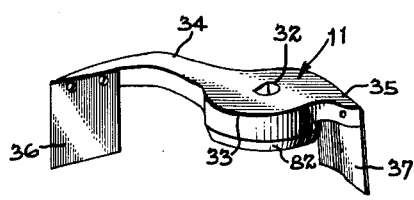
Figure 2 is a perspective view of the scraper blade assembly.

The lower portion or body of the machine preferably comprises a single casting which mounts the drive mechanism and which at the bottom includes a flat base 45 upon which the machine rests. The base preferably is aproximately circular and about the size of the shell. At one side the base includes a mount 46 for an electric drive motor 47. The body of the machine may be substantially the shape shown, and includes a flat upper surface 50 to which the circular table 43 is affixed by bolts 51. Centrally the table is cut out to accommodate a turret 52 which is formed as a part of the body 13 of the machine and which extends up above the table as shown in Figure 5. The inside 53 of the turret is hollow. Within the casting a heavy web 54 is provided, the web extending horizontally from wall to wall and including a centrally located aperture 55 which is in vertical alignment with the hollow central portion 53 of the turret. Concentric with the hollow center, the upper end of the turret is machined out to provide a circular seat for a ball bearing 56. Preferably, although not necessarily, the seat is of such diameter that the ball bearing is held therein in press fit relationship. Concentric with the aperture 55 in web 54 a similar seat is machined out to receive in press fit relationship a ball bearing 57. The axis of bearings 56 and 57 are aligned vertically and a drive shaft 58 rotatably journalled therein. Where shaft 58 is embraced by the inner race of the upper bearing 56, a hub portion 60 is provided, the hub being press fitted into the bearing so that it is constrained against vertical movement relative to the bearing. At lower bearing 57, a hub 61 similar to the hub 60 is provided for engagement with the inner race of bearing 57. The shaft extends downwardly beyond bearing 57 into the hollow portion inside the body casting beneath web 54. At the lower end, a large gear 62 is pinned to the shaft, this gear being in driving engagement with a worm gear 63. Gear 63 is keyed to the outer end of the drive shaft 64 of motor 47. It will be noted from Figure 3 in particular, that the upper end of the drive shaft 58 extends up beyond the upper end of the turret and at this point has a flat face 65 machined thereon, the flat face cooperating with the flat sides of the bores in the muller wheel assembly and the scraper blade assembly to key the drive to these members.

Figure 6:
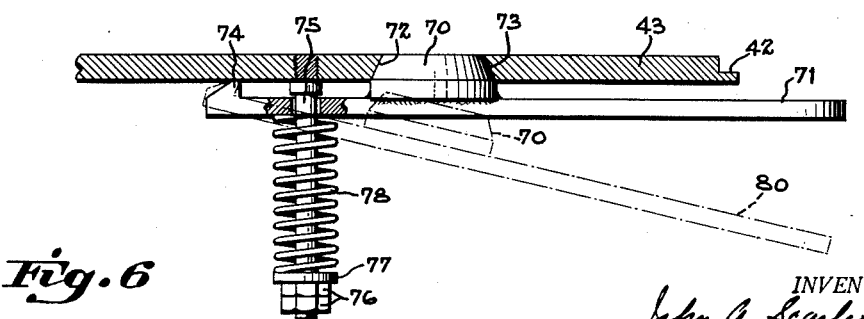
Figure 6 is a cross sectional view taken on the line 6—6 of Figure 4, illustrating the details of construction of a preferred form of discharge door.

The preferred form of a discharge door for the present machine is shown in Figure 6. The door comprises a taper plug 70 which is welded to a handle 71. The plug preferably includes a conical portion 72 which is designed to cooperate with a tapered bore 73 in the table 43. The outer end of the handle 71 extends outwardly beyond the edge of the table so that it is accessible to the operator of the machine. At the inner end the handle is provided with a boss 74 which provides a fulcrum point about which the handle may be pivoted in order to move the plug 70 downwardly away from the tapered bore 73. Between boss 74 and plug 70 a hole is provided in the handle and a stud 75 extended therethrough. The upper end of the stud is welded into a bore in the table. The lower end of stud 75 is threaded and carries a pair of nuts 76. Above the nuts a washer 77 is installed, the washer providing a seat for a coil spring 78 which surrounds the stud and engages the underside of the handle 71, tending to force it upwardly into closed position. In order to open the door, the outer end of the handle is lowered to the position shown by the dot-dash lines 80 in Figure 6 and then swung to one side, removing the plug 70 from beneath bore 73 for the discharge of material. In this movement, the handle pivots about stud 75 and boss 74 simply slides along the under surface of the table.

In assembled position, the scraper blade assembly is mounted on turret 52. As seen in Figure 5, the underface of the hub portion 33 of the scraper blade assembly is provided with an annular boss 81 which engages the inner race of ball bearing 56 so that there is no contact between the scraper blade assembly and the turret. In addition, the outer margin of hub 33 is configurated to provide a skirt 82 which depends down around the upper end of the turret 52 and serves to keep the material being operated upon from getting into bearings 56. The cross shaft of the muller wheel assembly is in driving engagement with shaft 58 above the hub portion of the scraper blade assembly.

Figure 7:
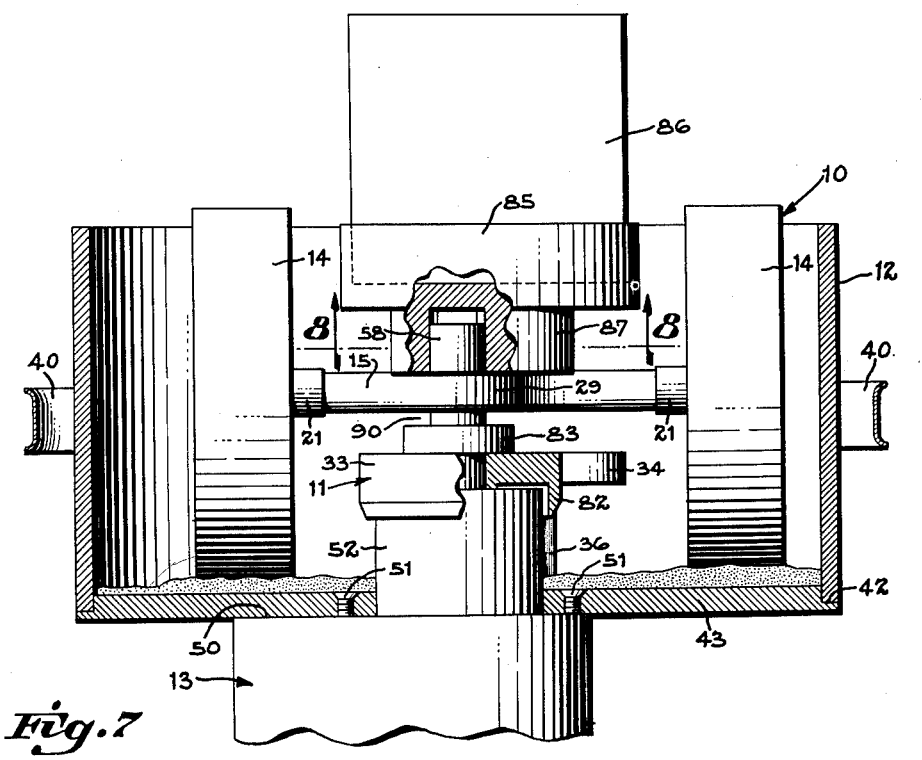
Figure 7 is a cross sectional view of the upper portion of the machine showing a slight modification of the muller wheel assembly in which a provision is made for increasing the mulling pressure exerted by the wheels.

It will be noted that there is a space between the underside of the cross shaft and the upper surface of hub 33. If desired, washers may be slipped onto the shaft 58 in this space in order to raise the treads 16 of the two muller wheels off the work table 43. A washer in this position is shown in Figure 7 at 83. The use of washers are desirable in certain operations where it is desired to knead mixes without imparting a crushing action to them. It will be noted further from Figure 5 that the muller wheel assembly is free to float vertically on the upper end of the drive shaft and further that a slight clearance indicated at 84 is provided between the shaft and the bore 27 through the cross shaft so that the two wheels have a certain amount of play. Preferably, the scraper blade assembly is set at 90° to the cross shaft.

Figure 8:
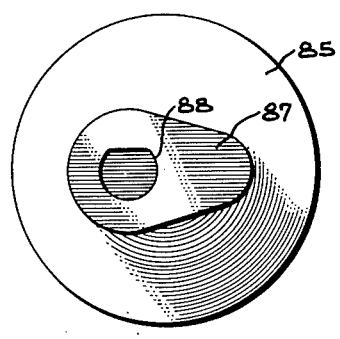
Figure 8 is a cross sectional view taken on the line 8—8 of Figure 7.

If it is desired to increase the mulling pressure of the wheels, added weight can be placed upon the assembly by the means shown in Figure 7. In this instance, a cup-shaped member 85 is employed, the upper surface of the member being recessed to receive a receptacle such as 86 in which lead shot or other small weighty objects can be placed. If desired, several containers, similar to the one shown at 86 may be utilized, the containers being closed and different weights in them. On the underside of the cup-like member 85 a boss 87 is provided. The boss may be formed as an integral part of the cup-like member, the wheel unit being formed by casting. Referring to Figure 8, it will be observed that the boss is generally oval in shape and flat on the bottom so as to rest upon the central hub portion of the cross shaft 15. The boss 87 contains a bore 88 which is designed to accommodate the flat 65 on the upper end of the drive shaft 58 so that the cup-like element revolves with the shaft. The hole 88 is off center with respect to the cup-like element in an amount equal to the off center relationship of the bore 27 to the two muller wheels 14—14. This relationship places the weight carried in the cup-like member 85 directly between the two wheels so that it is distributed equally to them. The hole 88 is rather deep and clears the upper end of shaft 58 under the conditions of operation shown in Figure 7. In this instance, a washer 83 is interposed between the muller and scraper assemblies and is of such width that the wheels will not touch the upper surface of the work table 43. The washer thus prevents the muller wheels from contacting the work table in sand crushing relationship but, rather, stops the sinking of the muller wheel assembly short of such point. Of course, different thicknesses of washers may be employed in order to vary the relationship of the wheels to the table. In the instance shown, the weight inside container 86 is distributed directly onto the material being mulled since there is a space indicated at 90 between the upper face of washer 83 in the lower face of the hub 33 of the cross shaft. It will be appreciated that the cup-like member provides an exceedingly simple way of varying the mulling pressure of the wheels and one which does not detract from the simplicity of the construction or operation of the machine.

Figure 4:
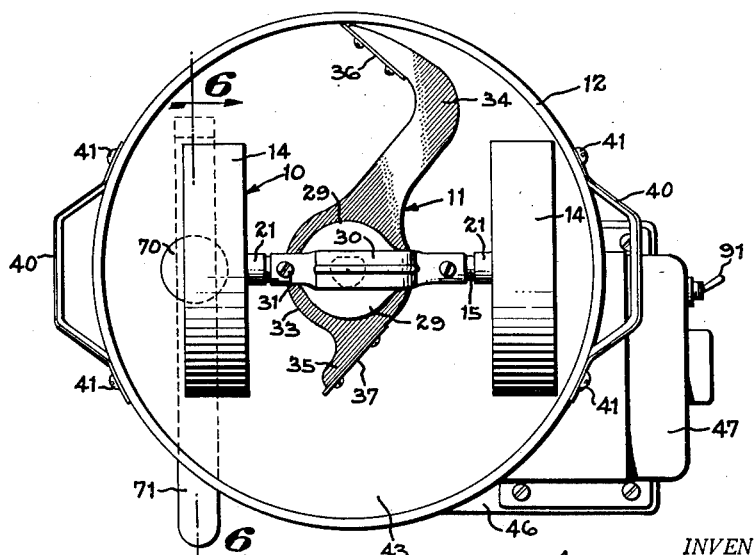
Figure 4 is a top plan view of the machine with the muller wheel and scraper blade assemblies in place.

The mulling action of the machine is substantially identical with that of the large production type machines. When the motor is turned on at switch 91, drive shaft 58 is caused to rotate through the connection afforded by gears 62 and 63 and both the cross shaft 15 and scraper blade hubs, being keyed to the shaft, are caused to rotate with it. As the wheels 14 pass over material, it is squeezed or forced outwardly from beneath them, so that the material is spread upon the work table 43. At the same time however, the scraper blade assembly, in revolving with the wheel assembly, is working upon the mix, plowing it outwardly with blade 37 and inwardly with blade 36. Observing Figure 4, blade 37 is positioned so that the material is plowed out to a position where it is rolled upon by the wheel shown at the left, whereas the material acted upon by blade 36 is plowed into a position where it is rolled under the muller wheel shown at the right. Thus, the material is being constantly turned over and over and kneaded repeatedly so that a complete dispersion of bonding agent is made.

As pointed out above, this action differs but little from the action obtained in the large production type mullers. The present machine does differ substantially however in the construction of the parts comprising the muller apparatus in that they are arranged so that they can be disassembled by simply lifting them off the upper end of drive shaft 58. This is also true of the modification in Figure 7 and although in this modification the strap 30 which is shown in the preferred embodiment cannot be used, in order to facilitate lifting the muller wheel assembly, it will be appreciated that even without the aid of the strap, the muller wheel assembly can be handled easily. Once off the shaft or out of the machine, the muller wheel assembly can be cleaned very easily by using an air pressure gun, a whiskbroom or rag, or washed, if desired. The design of this assembly is such that there are no hard-to-clean protruding elements, links, bolts or other members which would be harmed by such cleaning. The scraper blade assembly also may be lifted free of the machine in the same manner and it too is free of any protruding parts. Also, the shell can be lifted from the machine so that the entire work table is exposed where it can be easily cleaned.

The discharge door is positioned at a point midway between the lines of travel of the two muller wheels where it will receive material being scraped by both blades 36 and 37 thus, in discharging material, the machine may be run with or without the muller wheels in place and all material will be pushed toward the discharge point. The fact that the muller wheel assembly can be lifted out of the machine so easily, makes it possible to assist in the discharge by hand, through the use of a scraper blade such as a putty knife or the like, to speed up this operation.

The machine disclosed here may be also used for crushing frangible materials. For example, it may be used for pulverizing coal for analysis. The modification shown in Figure 7 of the drawings is particularly well suited for this work. In crushing materials, the washer 83 may be omitted so that the muller wheels are permitted to ride directly upon the work table 43. If desired, a larger motor may be utilized and the various parts of the mulling apparatus made structurally heavier than that indicated in the drawings in order to increase the efficiency of the machine when used for crushing.

Having described my invention, I claim:

1. In a mulling machine, muller means comprising a muller wheel assembly, said assembly including a pair of muller wheels and a cross shaft, said wheels rotatably journalled at the respective ends of the cross shaft, a scraper blade carriage, said carriage including a hub portion and a pair of scraper blade supporting arms extending from opposite sides of the hub portion, a vertically disposed drive shaft, said shaft adapted to receive the carriage and assembly in vertically slidable driving relationship in which the assembly is above and spaced from the carriage and the scraper blade supporting arms are spaced circumferentially with respect to said muller wheels, and a cup member adapted to engage over the upper end of the drive shaft and rest upon said cross shaft, said cup member adapted to receive weighty objects whereby the weight of the objects is transmitted through the cross shaft to the muller wheels.

2. In a mulling machine for laboratory and experimental work, a circular work table, said table having a central opening therein, a turret extending upwardly through said opening and terminating above said table, a vertically disposed drive shaft rotatably journalled in said turret and having a keyed portion extending above the turret, a scraper blade carriage, said carriage including a hub portion having a bore therein fitting the drive shaft in vertically slidable keyed relationship immediately above said turret, a muller wheel assembly separate from the scraper blade carriage, said assembly including a pair of muller wheels and a cross shaft with the muller wheels rotatably journalled at the respective ends of the cross shaft, said cross shaft having a bore therein complementing the bore in the hub of the scraper blade carriage fitting the drive shaft above said hub in circumferentially offset relationship relative to said hub to space the blades of said carriage circumferentially with respect to said rollers, and said muller wheels being of such a diameter that when they are resting upon the work table a substantial space exists between the hub and cross shaft so that the scraping action of the blades of the carriage are not affected by either the motion or position of the muller wheel assembly.

3. In a mulling machine for laboratory and experimental work, a circular work table, said table having a central opening therein, a turret extending upwardly through said opening and terminating above said table, a bearing seated in the upper end of said turret, said bearing having an inner race and an outer race with the inner race freely rotatable with respect to the outer race, a vertically disposed drive shaft journalled by the inner race and having a keyed portion extending above said turret, a scraper blade carriage, said scraper blade carriage including a hub portion having a bore therein, said bore configurated to fit the keyed portion of the drive shaft in vertically slidable relationship, said carriage positioned upon said shaft immediately above the turret and resting upon the inner race of said bearing, a muller wheel assembly separate from the scraper blade carriage, said muller wheel assembly including a cross shaft, and a pair of muller wheels, said cross shaft having a bore therein complementing the bore in the hub of the scraper blade carriage and fitting the drive shaft above said hub in circumferentially offset relationship relative to said hub to space the blades of said carriage circumferentially with respect to said rollers, and said muller wheels being of such a diameter that when they are resting upon the work table a substantial distance is maintained between the hub and the cross shaft so that the scraping action of the blades of the carriage is not affected by either the motion or position of the muller wheels.

JOHN A. SCARLETT.

REFERENCES CITED

The following references are of record in the file of this patent:

UNITED STATES PATENTS

| Number | Name | Date |
| --- | --- | --- |
| 42,341 | Bertola | Apr. 19, 1864 |
| 456,623 | Lane | July 28, 1891 |
| 566,777 | Layng | Sept. 1, 1896 |
| 966,843 | Lieber | Aug. 9, 1910 |
| 1,054,011 | Markel et al. | Feb. 25, 1913 |
| 1,508,031 | Simpson | Sept. 9, 1924 |
| 2,049,866 | Rapp et al. | Aug. 4, 1936 |
| 2,377,307 | Brown | June 5, 1945 |
| 2,413,603 | Christensen | Dec. 31, 1946 |